United States Patent
Park et al.

(10) Patent No.: US 8,988,577 B2
(45) Date of Patent: *Mar. 24, 2015

(54) DIGITAL IMAGE PROCESSING APPARATUS AND METHOD FOR SIMULTANEOUSLY DISPLAYING INPUT IMAGE AND SETTING INFORMATION ON DISPLAY SCREEN

(75) Inventors: Se-hyun Park, Seoul (KR); Jung-ah Heo, Seoul (KR); Hyo-sang Bang, Seoul (KR); Hye-jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

This patent is subject to a terminal disclaimer.

(21) Appl. No.: 12/979,548

(22) Filed: Dec. 28, 2010

(65) Prior Publication Data

US 2012/0127332 A1  May 24, 2012

(30) Foreign Application Priority Data

Nov. 19, 2010  (KR) ........................ 10-2010-0115761

(51) Int. Cl.
*H04N 5/222* (2006.01)
*H04N 5/232* (2006.01)

(52) U.S. Cl.
CPC .......... *H04N 5/23293* (2013.01); *H04N 5/232* (2013.01)
USPC .................................................. 348/333.02

(58) Field of Classification Search
USPC ........ 348/333.01–333.07; 396/281–296, 374; 358/527; 345/157, 660; 715/767
See application file for complete search history.

(56) References Cited

U.S. PATENT DOCUMENTS

| | | | | |
|---|---|---|---|---|
| 5,742,852 A * | 4/1998 | Takagi et al. | ................. | 396/229 |
| 2002/0158983 A1* | 10/2002 | Fellegara et al. | ........ | 348/333.11 |
| 2003/0222889 A1* | 12/2003 | Parulski et al. | ............... | 345/619 |
| 2004/0179131 A1* | 9/2004 | Honda et al. | .................. | 348/362 |
| 2005/0094018 A1* | 5/2005 | Oyama | .................... | 348/333.12 |
| 2005/0264693 A1* | 12/2005 | Kondo et al. | ................. | 348/458 |
| 2005/0270397 A1* | 12/2005 | Battles | ..................... | 348/333.01 |
| 2007/0188482 A1* | 8/2007 | Fujimori | ....................... | 345/204 |
| 2007/0229672 A1* | 10/2007 | Kaneda | ...................... | 348/218.1 |
| 2007/0291152 A1* | 12/2007 | Suekane et al. | .......... | 348/333.02 |
| 2008/0252753 A1* | 10/2008 | Ejima et al. | ............. | 348/231.99 |
| 2009/0040332 A1* | 2/2009 | Yoshino et al. | ............ | 348/222.1 |
| 2010/0066729 A1* | 3/2010 | Li et al. | ......................... | 345/418 |

* cited by examiner

*Primary Examiner* — Mekonnen Dagnew
(74) *Attorney, Agent, or Firm* — Drinker Biddle & Reath LLP

(57) ABSTRACT

A digital image processing apparatus, which displays a setting item designated by a user together with a setting status of a setting value for the setting item to allow the user to efficiently set items necessary for photographing and/or other operations, and a control method for the apparatus. The apparatus includes: a body; and a display unit on the body where setting information is displayed, wherein a display screen displayed on the display unit includes: a selection region where at least one setting item is displayed; and an adjustment region where a currently set current setting value is displayed together with candidate setting values that can be set for at least one of the at least one setting item.

33 Claims, 10 Drawing Sheets

DIGITAL IMAGE PROCESSING APPARATUS AND METHOD FOR SIMULTANEOUSLY DISPLAYING INPUT IMAGE AND SETTING INFORMATION ON DISPLAY SCREEN

CROSS-REFERENCE TO RELATED PATENT APPLICATION

This application claims the priority benefit of Korean Patent Application No. 10-2010-0115761, filed on Nov. 19, 2010, in the Korean Intellectual Property Office, the entire disclosure of which is incorporated herein by reference.

BACKGROUND

1. Field of the Invention

Embodiments relate to a digital image processing apparatus and a method of controlling the apparatus, and more particularly, to a digital image processing apparatus, which displays a setting status necessary for an operation of capturing an image and/or for other operations on a display device to facilitate user's manipulation, and a method of controlling the apparatus.

2. Description of the Related Art

Generally, a digital image processing apparatus includes any apparatus which receives or processes an image or uses an image recognition sensor, such as a film camera, a digital camera, a personal digital assistant (PDA), a phone camera, a personal computer (PC) camera, etc.

In particular, the digital image processing apparatus may receive an image through an imaging device, process the image input with a digital signal processor, compress the processed image to generate an image file, and store the image file in a storage medium.

The digital image processing apparatus may also display the image input through the imaging device or an image from the image file stored in the storage medium on a display device such as a liquid crystal display (LCD) to allow a user to view the displayed image.

SUMMARY

Embodiments include a digital image processing apparatus, which displays a setting item designated together with a setting status of a setting value for the setting item to allow the user to efficiently set items necessary for photographing and/or other operations, and a control method for the apparatus.

According to an embodiment, there is provided a digital image processing apparatus. The apparatus includes a body and a display unit on the body where setting information is displayed, wherein a display screen displayed on the display unit may include: a selection region where at least one setting item is displayed; and an adjustment region where a currently set current setting value is displayed together with candidate setting values that can be set for at least one of the at least one setting item.

A selection bar may be displayed on the selection region and the selection bar may include the at least one setting item in a sequence according to a set display order.

An adjustment bar may be displayed on the adjustment region and the adjustment bar may include the currently set current setting value and the candidate setting values for a selection item designated by default or selected from among the at least one setting item disposed in a sequence.

Candidate items that are displayed on the selection bar may be designated, and a predetermined number of display items from among the candidate items may be displayed on the selection bar.

The selection item may be displayed differently from other display items.

When a number of display items is less than a number of the candidate items, a configuration of the display items may change with a change in the selection item.

The at least one setting item and a current setting value for the at least one setting item may be displayed together on the selection bar.

A setting range of candidate setting values that can be set for the selection item may be displayed according to a set order and the current setting value may also be displayed together with the setting range on the adjustment bar.

The setting range may be displayed as at least one of an image and a character on the adjustment bar, and a lower limit, an upper limit, and a current setting value of the setting range may be displayed as characters.

The setting range may be displayed in the shape of at least one of a graduated ruler and a bar graph on the adjustment bar.

The setting range of candidate setting values that can be set for the selection item may be displayed on the adjustment bar, such that the candidate setting values are consecutively displayed according to a magnitude thereof.

The apparatus may further include a lens module mounted on the body, wherein a selection unit for selecting a selection item to be set from among setting items is in at least one of the body and the lens module, and an adjustment unit for adjusting a setting value for the selection item by manipulation of the adjustment unit is in the lens module.

The selection unit may be at least one of a button, a sliding switch, and a rotation selector switch.

The selection unit may be a selection ring installed in a lens barrel, and the selection ring may be adapted to be at least one of rotated with respect to the lens barrel and slid in a longitudinal direction of the lens barrel.

The adjustment unit may be an adjustment ring installed in a lens barrel.

The adjustment ring may be at least one of a focus adjust ring for adjusting focus by manipulation thereof, a zoom adjust ring for adjusting zoom by manipulation thereof, and an aperture adjust ring for adjusting an aperture by manipulation thereof.

The lens module may be detachable from the body.

By at least one of a selection of a menu setting and a designated button, the selection bar may be displayed on the selection region, and the adjustment bar may be displayed on the adjustment region.

When the selection unit operates, a selection bar may be displayed on the selection region, and an adjustment bar may be displayed on the adjustment region.

When the adjustment unit operates during an on-state of a set function, a selection bar may be displayed on the selection region, and an adjustment bar may be displayed on the adjustment region.

The selection bar may be displayed on the selection region such that the display items are placed according to a set order between a left of the display unit and a right of the display unit, and the adjustment bar may be displayed on the adjustment region in parallel with the selection bar.

The selection bar and the adjustment bar may be displayed in at least one of an upper end portion and a lower end portion of the display unit.

The selection bar may be displayed on the selection region such that display items are placed according to a set order between an up direction of the display unit and a down direction of the display unit, and the adjustment bar may be displayed on the adjustment region in parallel with the selection bar.

The selection bar and the adjustment bar may be displayed in at least one of a left end portion and a right end portion of the display unit.

The adjustment unit may be an adjustment ring installed in the lens barrel, and the adjustment ring may be slid in a longitudinal direction of a lens barrel.

A setting value set by at least one of the at least one setting item having a discontinuous setting value may be changed by a manipulation unit that is at least one of a button, a sliding switch, and a rotation selector switch.

A setting value set by at least one of the at least one setting item having a continuous setting value may be changed by a ring-type manipulation unit.

At least one of the selection region and the adjustment region may be in a blank region generated due to a difference in an aspect ratio between the display unit and an image sensor of the display unit.

When a live view image is displayed on the display unit, currently set setting information may be displayed on the blank region.

When a preset setting function is called, at least one of the selection region and the adjustment region may be displayed on the blank region.

The selection unit may be behind the adjustment unit with respect to the body, and the selection region may be below the adjustment region on the display unit.

The selection unit may be in front of the adjustment unit with respect to the body, and the selection region may be above the adjustment region on the display unit.

When a setting value for the at least one setting item is changed, the changed setting value may be reflected in real time during an operation.

The apparatus may further include an image input unit through which an input image is inputted, wherein if a setting value for the at least one setting item is changed, the input image is inputted based on the changed setting value, and the input image is displayed as a live view on the display unit.

When a setting value for one of the at least one setting item including aperture, shutter speed, and exposure is changed, a setting value for another setting item may also be changed in association with the changed setting value.

According to another embodiment, there is provided a method of controlling a digital image processing apparatus. The method includes: receiving an input image, displaying the input image on a display unit, displaying at least one setting item on a selection region which is at least a region of the display unit, and displaying a currently set current setting value and candidate setting values that can be set for at least one of the at least one setting item together on an adjustment region which is at least a region of the display unit.

A selection bar, where display items are in a sequence according to a set display order, may be displayed on the selection region, and an adjustment bar, where for a selection item designated by default or selected from among the display items, a currently set current setting value and candidate setting values that can be set are in a sequence, may be displayed on the adjustment region.

The setting items and current setting values for the respective setting items may be displayed together on the selection bar.

A setting range of the candidate setting values that can be set for the selection item may be displayed on the adjustment bar, such that the candidate setting values are consecutively displayed according to a magnitude thereof.

By at least one of a selection of a menu setting and a designated button, the selection bar may be displayed on the selection region, and the adjustment bar may be displayed on the adjustment region.

BRIEF DESCRIPTION OF THE DRAWINGS

The above and other features and advantages will become more apparent by describing in detail exemplary embodiments thereof with reference to the attached drawings in which.

DETAILED DESCRIPTION

Exemplary embodiments will be described in detail with reference to the accompanying drawings.

Figure 1:
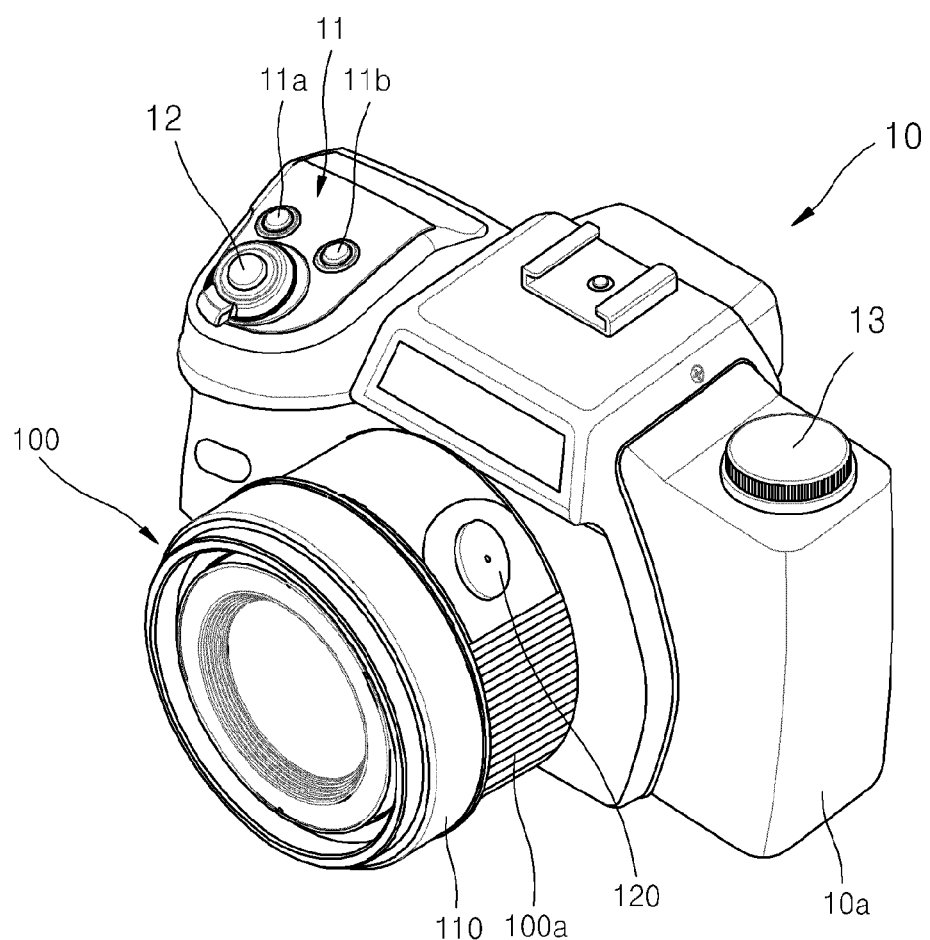
FIG. 1 is a front, perspective view of a digital image processing apparatus according to an embodiment.
Figure 2:
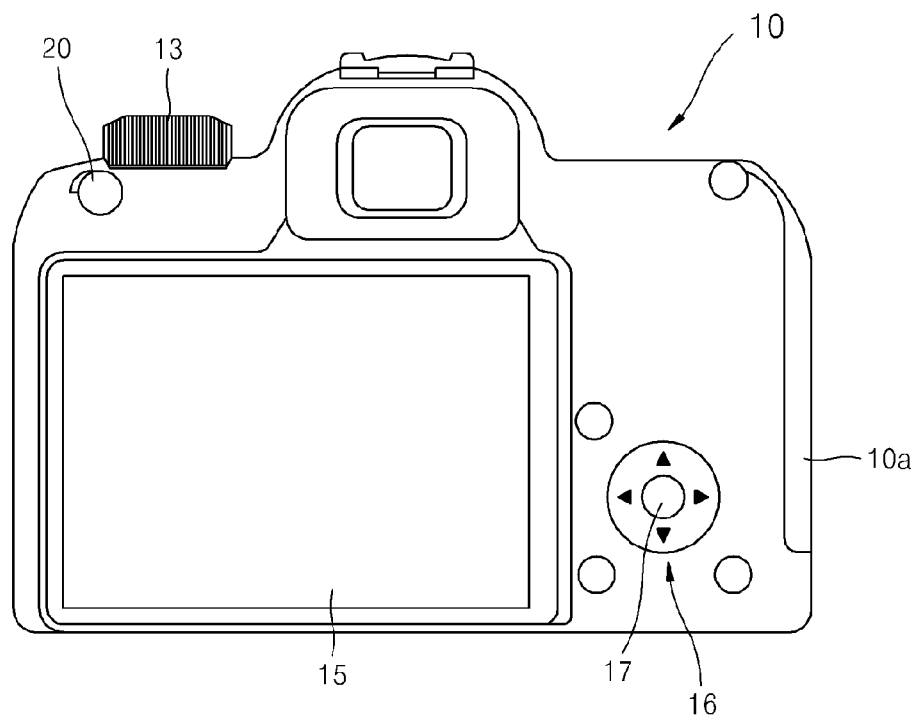
FIG. 2 is a rear elevational view of the digital image processing apparatus shown in FIG. 1 according to an embodiment.

FIG. 1 is a perspective view showing a front side of a digital image processing apparatus, according to an embodiment. FIG. 2 is a view showing a rear side of the digital camera 10 shown in FIG. 1 according to an embodiment.

Referring to FIGS. 1 and 2, the digital image processing apparatus may be a digital camera 10 that includes a body 10a, and a lens module 100.

The body 10a may be a main body of the digital camera 10, and may include various components, which are necessary for operating the digital camera 10 disposed on inner and/or outer sides of the body 10a.

The lens module 100 may be mounted on the body 10a. The lens module 100 may be a replaceable lens module which is mounted removably from the body 10a. The lens module 100 may alternatively be a fixed lens rather than a replaceable lens. However, the lens module 100 is not limited to the above examples.

The lens module 100 may include a lens barrel 100a, an adjustment unit (or adjustment ring) 110, and a selection unit (or selection button) 120. In the lens barrel 100a, at least one lens may be installed to move in an optical-axis direction. The adjustment ring 110 and/or the selection button 120 may be installed on or in the lens barrel 100a.

In some embodiments, the adjustment unit 110 may be an adjustment ring 110, which allows adjustment of a setting value of a selection item selected by manipulating the adjustment unit. The adjustment ring 110 may change or adjust a setting value of a particular setting item by being manipulated. The adjustment ring 110 may be mounted on or in the lens module 100 to allow a user to easily change and/or adjust a setting value.

In some embodiments, the selection unit 120 may be a selection button 120 for selecting a selection item to be set from among a plurality of setting items. The selection button 120 may, by being manipulated, call an i-Function (iFn) menu or change a setting item to be set.

In the embodiment shown, both the adjustment ring 110 and the selection button 120 are installed in the lens module 100. However, the adjustment ring 110 and/or the selection button 120 may also be installed on or in the body 10a, and are not limited to the foregoing example.

When the lens module 100 is a replaceable lens module, a focus, a zoom, and an aperture may be adjusted in the lens module 100; and therefore, the user often manipulates the lens module 100. A physical user interface (PUI) or a separate manipulation ring for manipulating the focus, the zoom, and the aperture may be used as a selection unit 120 and/or an adjustment unit 110.

Accordingly, by using the selection unit 120 and/or the adjustment unit 110, the user may easily perform a setting operation necessary for a photographing operation of the camera 10 and/or other operations.

For the photographing operation of the digital camera 10 or other various operations, setting values of setting items may be set or changed. Upon manipulation of the adjustment ring 110, a setting value of a setting item designated to correspond to the manipulation may be set or changed.

The setting item set by the manipulation of the adjustment ring 110 may be at least one of a photographing mode, white balance, exposure correction, flash radiation intensity adjustment, sensitivity adjustment, digital zoom, and focusing region change.

When a zoom ratio of digital zoom is designated as the setting item to be set by manipulation of the adjustment ring 110, the angle of view may be changed by using digital zoom, as in the case of a single-focus lens.

In the embodiment shown, the selection button 120 is used as the selection unit 120. However, the selection unit 120 may be at least one of a button, a sliding switch, and a rotational selector switch, and is not limited to the foregoing examples.

The setting item to be set may be changed by a selection operation of the selection unit 120. For example, setting items to be set by manipulation of the adjustment ring 110 are designated and an order thereof is designated, and a setting item to be set by manipulation of the adjustment ring 110 may be changed according to the number of times the selection unit 120 is selected.

The selection unit 120 may be a selection ring 120a which is installed as a ring type device on the lens barrel 100a. The selection ring 120a may be rotated with respect to the lens barrel 100a or may be slid in a longitudinal direction of the lens barrel 100a.

In another embodiment, the selection unit 120 may be a rotational selector switch of the same type as the mode dial 13 installed in the body 10a. In still another embodiment, the selection unit 120 may be a menu system displayed on a display device 15 (shown in FIG. 2) installed in the body 10a.

The adjustment ring 110 may be installed as a ring type device which encloses at least an outer part of the lens barrel 100a, preferably disposed around an outer circumferential surface of the lens barrel 100a. The adjustment ring 110 may be installed to be rotatable with respect to the lens barrel 100a. In this case, the adjustment ring 110 may be rotated with respect to the lens barrel 100a. The adjustment ring 110 may have a structure capable of rotating around a particular section or infinitely.

Figure 5:
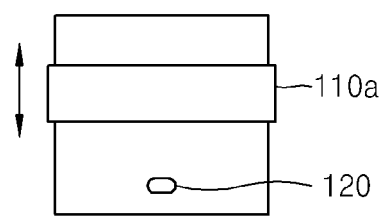
FIG. 5 is a diagram of a method of manipulating a lens module separated from a digital image processing apparatus, according to another embodiment.

In another embodiment, as shown in FIG. 5, the adjustment ring 110a may be installed so as to be slidable with respect to the lens barrel 100a in the optical-axis direction of the lens. In this case, the adjustment ring 110 may be slid forward or backward in the optical-axis direction with respect to the lens barrel 100a.

However, embodiments are not limited to the foregoing examples, and the adjustment ring 110a may be installed to be rotated and slid with respect to the lens barrel 100a. In such an embodiment, the adjustment ring 110a can be rotated and/or slid with respect to the lens barrel 100a. As such, by allowing the adjustment ring 110a to be manipulated in various ways, user convenience in setting a setting value by using the adjustment ring 110a can be improved.

In the digital camera 10, various types of lens module 100 as shown in FIGS. 4, 5, 6, 11, or 12 as well as the lens module 100 shown in FIG. 1 may be replaced and mounted.

The lens module 100 according to the embodiment shown in FIG. 1 includes a single adjustment ring 110. The adjustment ring 110 may be an aperture adjustment ring for adjusting an aperture by manipulation thereof, a zoom adjustment ring for adjusting zoom by manipulation thereof, or a focus adjustment ring for adjusting focus by manipulation thereof.

The lens module 100 includes at least one of the focus adjustment ring, the zoom adjustment ring, and the aperture adjustment ring, and one or more adjustment rings selected by selection of the selection button 120 may be the adjustment ring 110 of the digital camera 10 according to an embodiment. In this way, a setting value to be set can be easily set or changed without a need to mount an additional apparatus and sensor structure for a separate adjustment ring.

To this end, a setting item to be set by the adjustment ring 110 is previously designated and whether to set a setting value of the previously designated setting item, focus, zoom, or aperture by manipulation of the adjustment ring 110 is selected by selection of the selection button 120.

Figure 6:
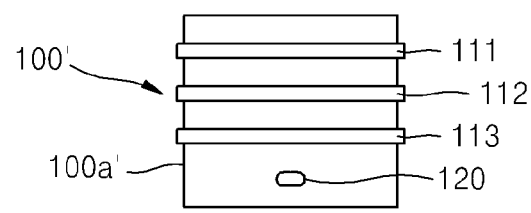
FIG. 6 is a diagram of a lens module separated from a digital image processing apparatus, according to another embodiment.

In an embodiment shown in FIG. 6, a lens module 100' includes an aperture adjustment ring 111, a zoom adjustment ring 112, and a focus adjustment ring 113 which are mounted on a lens barrel 100a'.

At least one of the aperture adjustment ring 111 for adjusting an aperture by manipulation thereof, the zoom adjustment ring 112 for adjusting zoom by manipulation thereof, and the focus adjustment ring 113 for adjusting focus by manipulation thereof may serve as the adjustment ring 110.

By selection of the selection button 120 or selection of another separately provided selector button (for example, button 20 of FIG. 2), at least one of the aperture adjustment ring 111, the zoom adjustment ring 112, and the focus adjustment ring 113 may be selected as the adjustment ring 110.

Meanwhile, a shutter-release button 12 and a mode dial 13 may be provided on an outer side of the body 10a of the digital camera 10. A direction button 16, a menu-OK button 17, and a display panel 15 may be provided on a rear side of the digital camera 10.

The shutter-release button 12 may open or close a shutter to expose an imaging device (for example, a charge coupled device (CCD) or a complementary metal oxide semiconductor (CMOS)) to light for a predetermined time. The mode dial 13 is used to input a photographing mode selection.

In the body 10a of the digital camera 10, various modes may be selected and inputted through the mode dial 13. The various modes can include an AUTO (automatic photographing) mode for minimizing user setting and quickly and conveniently capturing an image according to the purpose of use, a SCENE mode for simply setting optical camera settings according to a photographing condition or a state of an object, an EFFECT mode for giving a special effect to image capturing such as continuous capturing and scene capturing, and an A/S/M mode for manually setting various functions including an aperture and a shutter speed for a photographing operation.

The various modes may further include an additional mode, e.g., an intelligent function mode to allow at least one of the focus adjustment ring 113, the zoom adjustment ring 112, and the aperture adjustment ring 111 included in the lens module 100 to function as the adjustment ring 110 according to an embodiment. In this case, when the mode dial 13 provides the intelligent function mode and the intelligent function mode is selected, a corresponding set adjustment ring 111, 112, or 113 may operate as the adjustment ring 110.

The direction button 16 may include a total of four buttons including an up button, a down button, a left button, and a right button. Through operations of the direction button 16 and the menu-OK button 17, various menus associated with operations of the digital image processing apparatus, such as the digital camera 10, may be executed and displayed on the display panel 15.

A menu system is displayed on a display device such as the display panel 15, and operates by manipulation of a touch screen and/or the direction button 16 and the menu-OK button 17. In this case, setting items that can be set by manipulation of the adjustment ring 110 are designated and an order thereof may be designated by the menu system.

The menu system may be the selection unit 120 according to an embodiment which changes a setting item to be set, by selection thereof.

In the body 10a of the digital camera 10, a manipulation switch 11 for moving the lens forward or backward may be provided. The manipulation switch 11 may include a forward manipulation switch 11a and a backward manipulation switch 11b.

The lens module 100 may operate to move the lens forward by manipulation of the forward manipulation switch 11a. The lens module 100 may also operate to move the lens backward by manipulation of the backward manipulation switch 11b.

In the embodiment shown in FIG. 1, the focus adjustment ring may be used as the adjustment ring 110. In this case, by selection of the selection unit 120, the adjustment ring 110 may function as the focus adjustment ring or may be used as the adjustment ring 110 for setting a setting value for a setting item designated according to an embodiment.

When the adjustment ring 110 is used as the focus adjustment ring, upon manipulation of the adjustment ring 110, a focus mounted in the lens barrel 100a is moved forward or backward in the optical-axis direction to adjust focus. In particular, in an auto focusing mode where the focus adjustment ring is not used for focus control input, the focus adjustment ring may be used instead as the adjustment ring 110 without separate selection of the selection unit 120. In a manual focusing mode, the focus adjustment ring may be used for focus adjustment.

The display panel 15 may be an image display element such as a liquid crystal display (LCD). The display panel 15 may be included in a display unit where an input image is displayed as a live view or a stored image is reproduced and displayed. A control apparatus 200 shown in FIG. 3 may be mounted in an inner side and/or an outer side of the body 10a of the digital camera 10.

An embodiment of the digital image processing apparatus can be applied to a digital camera and an apparatus and method for controlling the same disclosed in U.S. Patent Application Pub. No. 2004/0130650 to the present applicant (entitled "Method of Automatically Focusing Using Quadratic Function in Camera"). The digital camera and the apparatus and method for controlling the same disclosed in the aforementioned U.S. Patent Application Pub. No. 2004/0130650 is incorporated herein in its entirety by reference, and a description thereof will not be provided.

Figure 3:
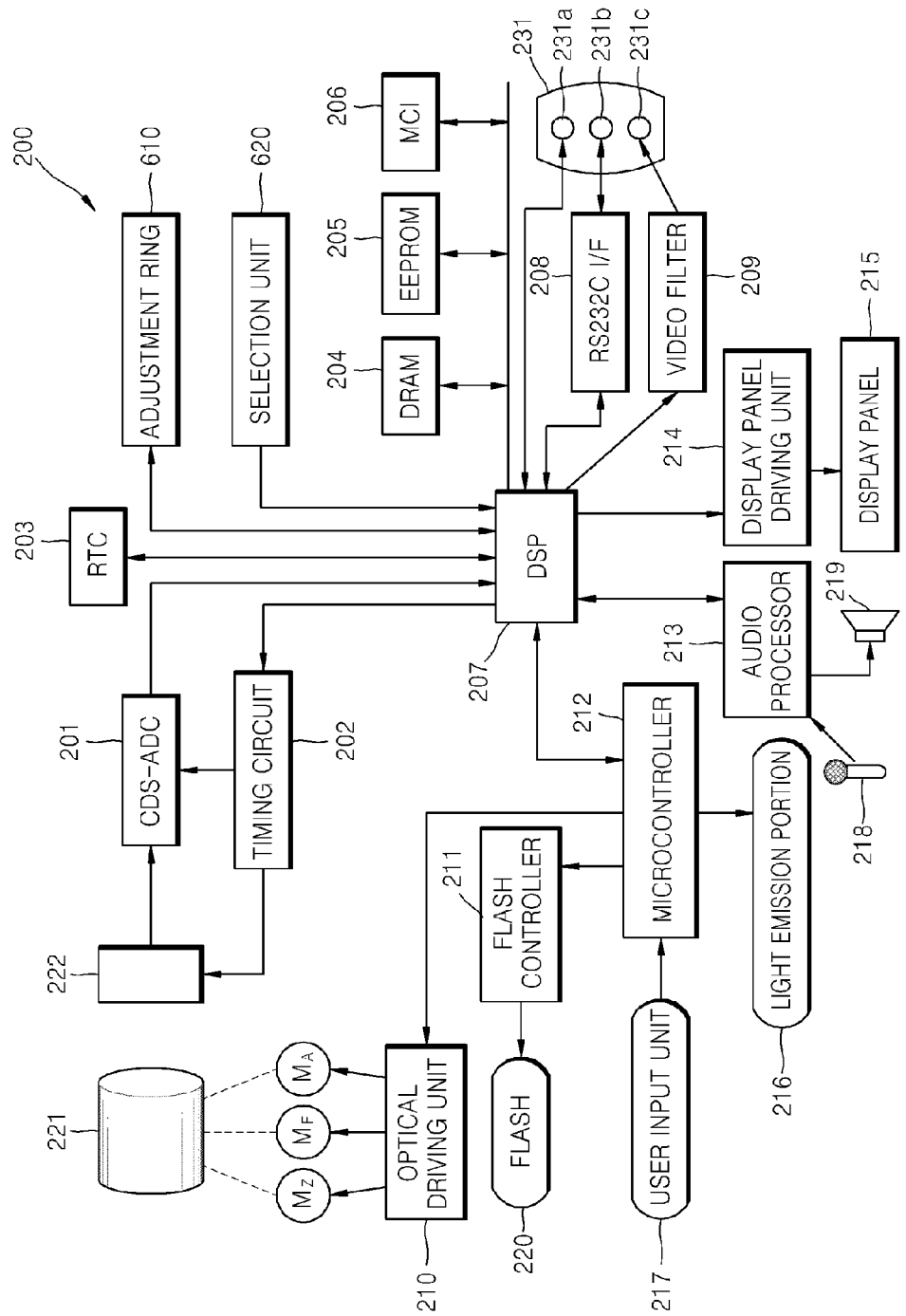
FIG. 3 is a schematic block diagram of a control apparatus included in the digital image processing apparatus shown in FIG. 1 according to an embodiment.
Figure 4:
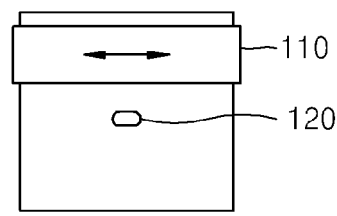
FIG. 4 is a diagram of a method of manipulating a lens module separated from a digital image processing apparatus, according to an embodiment.

FIG. 3 is a block diagram of the control apparatus 200 of the digital image processing apparatus according to an embodiment. The control apparatus 200 may be mounted in an inner side of the digital camera 10 shown in FIG. 1.

Referring to FIG. 3, an optical system (OPS) 221 may include a lens portion and a filter portion to optically process light incident from an object. The lens portion of the OPS 221 may include a zoom lens, a focus lens, and a compensation lens. Once a user presses a wide-angle-zoom button W or a telephoto-zoom button T included in a user input unit 217, a corresponding signal is input to a microcontroller 212.

In accordance with the microcontroller 212 and the user input unit 217, a zoom motor $M_Z$ can be driven to move the zoom lens. That is, when the wide-angle-zoom button W is pressed, a focal length of the zoom lens is reduced, thus increasing the angle of view; and when the telephoto-zoom button T is pressed, the focal length of the zoom lens is increased, thus reducing the angle of view.

In the auto focusing mode, a main controller embedded in a digital signal processor (DSP) 207 can control an optical driving unit 210 through the microcontroller 212 and thus drives a focus motor $M_F$. In other words, by driving the focus motor $M_F$, the focus lens can be moved to a focus position where the clearest picture can be obtained, thus performing automatic focus adjustment.

The compensation lens may not be separately driven because it compensates for an overall refractive index. An aperture adjustment motor $M_A$ can be used to drive an aperture.

The filter portion of the OPS 221 may include an optical low pass filter and an infra-red cut filter. The optical low pass filter can cancel optical noise of a high-frequency component. The infra-red cut filter can cut an infra-red component of incident light.

An optical-electronic converter (OEC) 222 may include an imaging device such as a charge coupled device (CCD) or a complementary metal oxide semiconductor (CMOS). The OEC 222 can convert light from the OPS 221 into an electric analog signal.

An analog-to-digital converter (ADC) may include a correlation double sampler and analog-to-digital converter (CDS-ADC) 201. The ADC can process an analog signal from the OEC 222 to cancel high-frequency noise from the analog signal and/or to adjust the amplitude of the analog signal, and can then convert the analog signal into a digital signal. The DSP 207 can control a timing circuit 202 to control operations of the OEC 222 and the CDS-ADC 201.

The OPS 221, the OEC 222, and the CDS-ADC 201 may be included in an image input unit for receiving an input image according to an embodiment.

A real-time clock (RTC) 203 can provide time information to the DSP 207. The DSP 207 can process the digital signal provided from the CDS-ADC 201 to generate a digital image signal classified with luminance (Y) and color (R, G, B) or chroma, brightness, and color (R, G, B).

A light emission portion 216 driven by the microcontroller 212 under the control of the main controller embedded in the DSP 207 may include a self-timer lamp, an auto-focusing lamp, a mode indication lamp, and a flash standby mode.

A dynamic random access memory (DRAM) 204 can temporarily store the digital image signal from the DSP 207. An electrically erasable and programmable read only memory (EEPROM) 205 can store algorithms and setting data, such as a booting program and a key input program necessary for an operation of the DSP 207. A user's memory card may be removable from a memory card interface (MCI) 206.

The digital image signal from the DSP 207 can be input to a display panel driving unit 214, and thus the image can be displayed on a display panel 215.

The display panel 215 and the display panel driving unit 214 for driving the display panel 215 may be included in a display unit according an embodiment. An input image may be displayed as a live view or a stored image may be reproduced and displayed on the display unit.

The digital image signal from the DSP 207 may be transmitted via serial communication through a universal serial bus (USB) connection unit 231*a* or an RS232C interface 208 and a connection unit 231*b* thereof, and may be transmitted as a video signal through a video filter 209 and a video output unit 231*c*. The DSP 207 may have a microcontroller embedded therein.

An audio processor 213 outputs an audio signal from a microphone 218 to the DSP 207 or a speaker 219, and outputs an audio signal from the DSP 207 to the speaker 219. A flash controller 211 controls an operation of a flash 220. The flash controller 211 may be controlled by a control signal that is output from the microcontroller 212.

Figure 7:
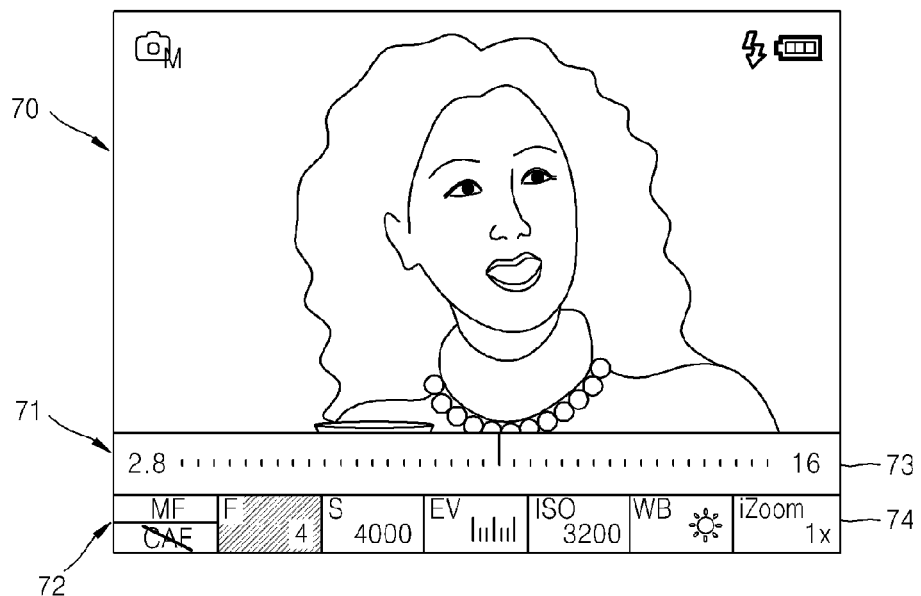
FIG. 7 is a diagram of an embodiment of an i-Function (iFn) menu displayed on a display panel of a digital image processing apparatus.
Figure 8:
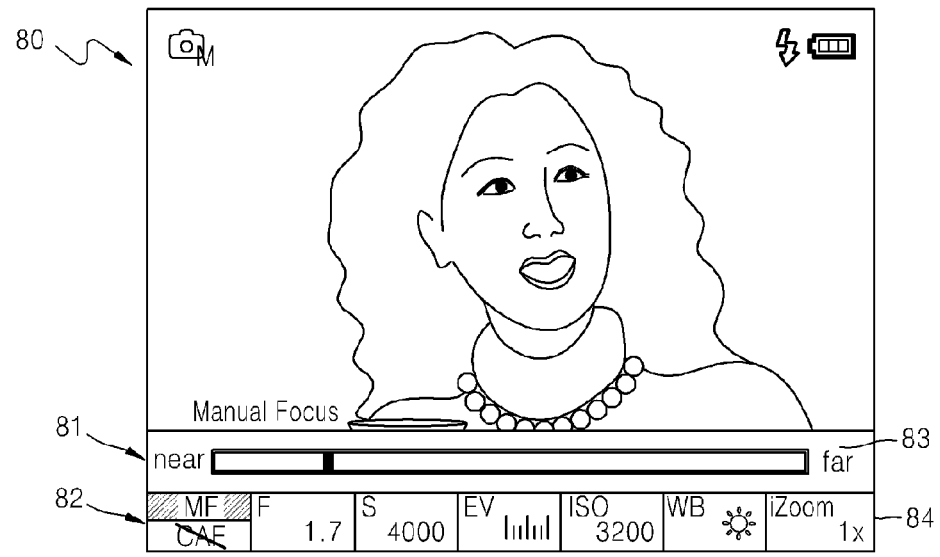
FIG. 8 is a diagram of another embodiment of the i-Function menu displayed on a display panel of a digital image processing apparatus.

FIGS. 7 and 8 schematically show embodiments of the i-Function menu displayed on the display panel 15 of the digital camera 10 shown in FIG. 2.

Referring to FIGS. 7 and 8, the display panel 15 can display display screens 70 and 80 which show an image and/or various settings or operation statuses. The display screens 70 and 80 may include selection regions 72 and 82, respectively, and adjustment regions 71 and 81, respectively.

The selection regions 72 and 82 may show at least one setting item. The adjustment regions 71 and 81 may show a setting value which is currently set for at least one displayed setting item, together with candidate setting values that can be set for the at least one displayed setting item.

In other words, at least one setting item and an adjustment status of a setting value for a particular setting item can be displayed on the display screens 70 and 80. Thus, the user can see setting items that can be set and a setting status of a setting item to be set at a glance on a single screen. As such, the apparatus for processing a digital image according to an embodiment can improve user convenience in a menu setting operation through the i-Function menu.

Menus displayed on the selection regions 72 and 82 and the adjustment regions 71 and 81 may be controlled by the selection unit 120, e.g., the selection button 120, and the adjustment unit 110, e.g., the adjustment ring 110. Thus, by interworking the physical user interface (PUI) and a graphic user interface (GUI), user convenience in a function setting operation can be improved.

Selection bars 74 and 84 may be displayed on the selection regions 72 and 82, respectively. The selection bars 74 and 84 may be displayed such that designated setting items are disposed in sequence according to a set display order on the selection regions 72 and 82.

Adjustment bars 73 and 83 may be displayed on the adjustment regions 71 and 81. The adjustment bars 73 and 83 may be displayed for a selection item designated by default or selected from among the display items displayed on the selection bars 74 and 84, such that a currently set setting value and candidate setting values that can be set may be disposed together in sequence on the adjustment regions 71 and 81.

The selection item may be a setting item designated by default upon call of an i-Function menu among candidate items. In another embodiment, the selection item may have been selected from among the display items displayed on the selection bar 74 or 84 by manipulation of the selection button 120 or the selection ring 120.

To this end, candidate items that can be displayed on the selection bar 74 or 84 may be designated, and a predetermined number of display items among the candidate items may be displayed on the selection bar 74 or 84. The selection item among the display items may be displayed differently from the other display items, thereby allowing the user to easily recognize the display item for which a setting value is displayed on the adjustment bar 73 or 83.

FIG. 7 shows an embodiment of an i-Function menu where aperture F is a selection item. Thus, aperture F may be the selection item and be displayed differently from the other display items.

The selection bar 74 may display focus auto (MF, CAF), aperture F, shutter speed S, exposure EV, sensitivity ISO, white balance WB, and zoom iZoom as display items. In the embodiment shown in FIG. 7, the aperture F is selected as a selection item, and the selection item may be displayed distinguishably by being dashed or colored differently.

FIG. 8 shows an embodiment of an i-Function menu where manual focus MF is a selection item. Thus, the manual focus MF may be the selection item and be displayed differently from the other display items.

The selection bar 84 may display focus (MF, CAF), aperture F, shutter speed S, exposure EV, sensitivity ISO, white balance WB, and zoom iZoom as display items. In the embodiment shown in FIG. 8, the manual focus is selected as a selection item, and the selection item may be displayed distinguishably by being dashed or colored differently.

When the number of display items displayed on the selection bar 74 or 84 is less than the number of candidate items, a configuration of display items may be changed with a change in selection items.

Setting items and current setting values therefor may be displayed together on the selection bar 74 or 84. For example, as shown in FIG. 7, aperture F and a setting value of 4 for the same, shutter speed S and a setting value of 4000 for the same, sensitivity ISO and a setting value of 3200 for the same, white balance WB and a setting value of sunlight for the same, and zoom iZoom and a setting value of x1 for the same may be displayed together on the selection bar 74.

On the adjustment bar 73 or 83, a setting range of candidate setting values for a selection item may be displayed according to a set order. A current setting value may also be displayed together with the setting range on the adjustment bars 73 and 83.

The setting range may be displayed in order of magnitude of candidate setting values for a setting item having a setting value distinguished by its magnitude. On the adjustment bar 73 or 83, a setting range of candidate setting values for a selection item may be displayed in order of magnitude.

The setting range of candidate setting values for a selection item may be displayed according to magnitude from left to right or from right to left. Thus, the user can intuitively recognize the setting range and the current setting value.

The setting range may be displayed as an image or a character on the adjustment bar 73 or 83. A lower limit, an upper limit, and a current setting value of the setting range may be displayed as characters on the adjustment bar 73 or 83. On the adjustment bar 73 or 83, the setting range may be displayed in the shape of a graduated ruler or a bar graph.

In the embodiment shown in FIG. 7, the aperture F is selected as a selection item, a setting range for the aperture F is displayed in the shape of a graduated ruler with a lower limit of 2.8 and an upper limit of 16 on the adjustment bar 73. A current setting value of 4 may be displayed in a position corresponding to the current setting value within the entire setting range displayed as a graduated ruler on the adjustment bar 73.

In the embodiment shown in FIG. 8, the manual focus MF is selected as a selection item and a setting range for the manual focus MF is displayed in the shape of a bar graph with a lower limit of near and an upper limit of far on the adjustment bar 83. A current setting value may be displayed in a position corresponding to the current setting value within the entire setting range displayed as a bar graph on the adjustment bar 83.

In this case, by manipulation of the selection button 120, the selection item may be activated while moving from left to right or from right to left on the selection bar 74 or 84. As the selection item is changed, a setting range and a setting value for the activated selection item may be automatically changed to range and values corresponding to the changed selection item. The change of the selection item may be made according to the number of times the selection button 120 is pressed.

By manipulation of the adjustment ring 110, the current setting value may be changed from left to right or from right to left on the adjustment bar 73 or 83. The current setting value may be applied as a setting value for a selection item by manipulation of a particular button, for example, the menu-OK button 17, thus changing the setting value for the selection item.

According to a direction of rotation of the adjustment ring 110, the setting value for the selection item may be increased or decreased. For example, if the adjustment ring 110 is rotated to the left, the current setting value may be decreased on the adjustment bar 73 or 83; if the adjustment ring 110 is rotated to the right, the current setting value may be increased on the adjustment bar 73 or 83.

In another embodiment, when a setting value for a setting item is changed, the changed setting value may be reflected in real time. In other words, upon manipulation of the adjustment ring 110, the current setting value of the selection item is changed on the adjustment bar 73 or 83 and the setting value of the selection item is reflected and changed in real time, such that input of an input image or an operation of the camera 10 may be performed with the changed setting value.

When a setting value of a setting item is changed, a setting value of another setting item may also be changed in connection with the setting value of the setting item. For example, for setting items including aperture, shutter speed, and exposure, when a setting value for one of these setting items is changed, a setting value of another setting item may also be changed at the same time.

In this case, when the setting value for the setting item is changed, an input image may be inputted based on the changed setting value, and the input image can be displayed as a live view on the display panel 15.

A change of the setting value associated with a photographing operation may be reflected in real time, and an input image may be input based on the changed setting value. The input image based on the changed setting value may be displayed as a live view on the display panel 15. Setting items changed in real time in association with a photographing operation may include aperture, shutter speed, and exposure.

By selection of a menu setting or a designated button (for example, button 20 of FIG. 2), an i-Function menu may be called and displayed on the display screen 70 or 80. In this case, once the i-Function menu is called, the selection bar 74 or 84 may be displayed on the selection region 72 or 82 and the adjustment bar 73 or 83 may be displayed on the adjustment region 71 or 81.

For example, by pressing the selection button 120 corresponding to the selection unit during operation of the camera, the i-Function menu may be called. Thus, a designated selection item is activated and the adjustment bar 73 or 83 for the selection item are displayed to allow the user to adjust a setting value for the selection item.

In another embodiment, when a particular menu is called or a particular button assigned to the particular menu is pressed during an on-state of the iFn, the i-Function menu may be displayed on the display screen 70 or 80. In another embodiment, if the adjustment unit, for example, the adjustment ring 110 is actuated during an on-state of a set function, e.g., the iFn, the selection bar 74 or 84 can be displayed on the selection region 72 or 82 and the adjustment bar 73 or 83 can be displayed on the adjustment region 71 or 81, such that the i-Function menu can be called.

Depending on a function and/or a feature set by a setting item, a scheme for matching the PUI and the GUI may change. Thus, by intuitively connecting the PUI and the GUI, function setting by the user can be facilitated.

In other words, if a setting value set by a setting item is independent, rather than continuous or homogeneous, it may be changed by a discontinuous type manipulation unit. If a setting value set by a setting item is continuous or homogeneous, it may be changed by a continuous type manipulation.

In this regard, white balance WB may be a setting item having a discontinuous setting value, and aperture F, shutter speed S, and zoom iZoom may be setting items having continuous setting values.

The discontinuous-type manipulation unit may be at least one of a button, a sliding switch, a rotation ring, and a rotation selector switch. The continuous-type manipulation unit may be a ring type manipulation unit. The ring-type manipulation unit may be rotated with respect to the lens barrel 100a or may be slid in the longitudinal direction of the lens barrel 100a.

Figure 9:
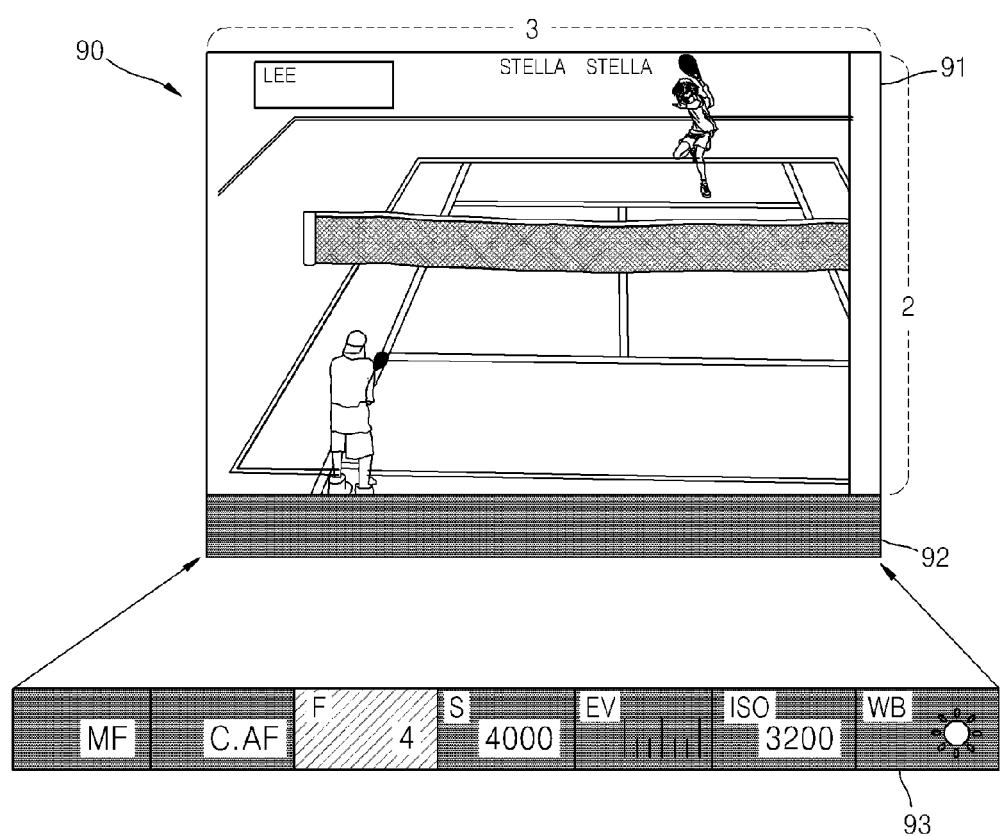
FIG. 9 is a diagram of an embodiment of a selection bar of the i-Function menu, which displayed in a blank region.

FIG. 9 shows an embodiment of a selection region 93 of an i-Function menu, which is displayed in a blank region 92 due to a difference in an aspect ratio between the display panel 15 and the imaging device. The aspect ratio of the display panel 15 may not be the same as that of the imaging device. In this case, when an input image inputted through the imaging device is displayed on the display panel 15 without changing the aspect ratio of the input image, a blank region 92 where no image is displayed may be generated on a display screen 90 of the display panel 15.

The entire display screen 90 may include an image region 91 where an image is displayed and the blank region 92 where no image is displayed. The blank region 92 may be a wasted region of the display screen 90. However, at least one of the selection region 93 and the adjustment region may be disposed on the blank region 92. In the embodiment shown in FIG. 9, the selection region 93 is disposed on the blank region 92.

Accordingly, the display screen 90 of the display panel 15 can be efficiently utilized.

Figure 10:
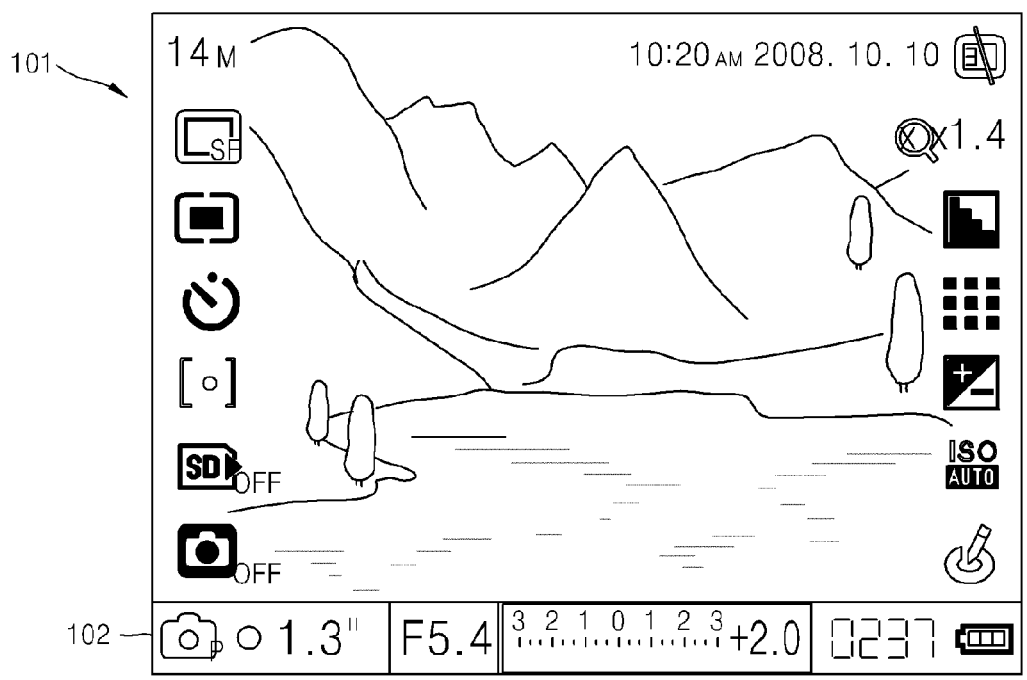
FIG. 10 is a diagram of an embodiment of a lower end portion of a display screen displayed on a display panel, which is used as an information display region.

In the embodiment shown in FIG. 10, a lower end portion of a display screen 101 displayed on the display panel 15 is used as an information display region 102.

That is, the lower end portion of the display screen 101 is used as the information display region 102 where a current setting status of a function necessary for a photographing operation or another operation of the camera may be shown to the user.

Once the i-Function menu is called, the information display region 102 can disappear and the selection bar 74 and the adjustment bar 73 as shown in FIG. 7 can be displayed on corresponding positions. In this case, in the i-Function menu, the simple passive information display region 102 may be used as an active information setting region with the selection bar 74 and the adjustment bar 73.

The information display region 102 may be the blank region 92 of FIG. 9. In this case, when a live view image is displayed on the display panel 15, currently set setting information may be displayed on the blank region 92. When a preset setting function, for example, the i-Function menu, is called, at least one of the selection region and the adjustment region may be displayed on the blank region.

Figure 11:
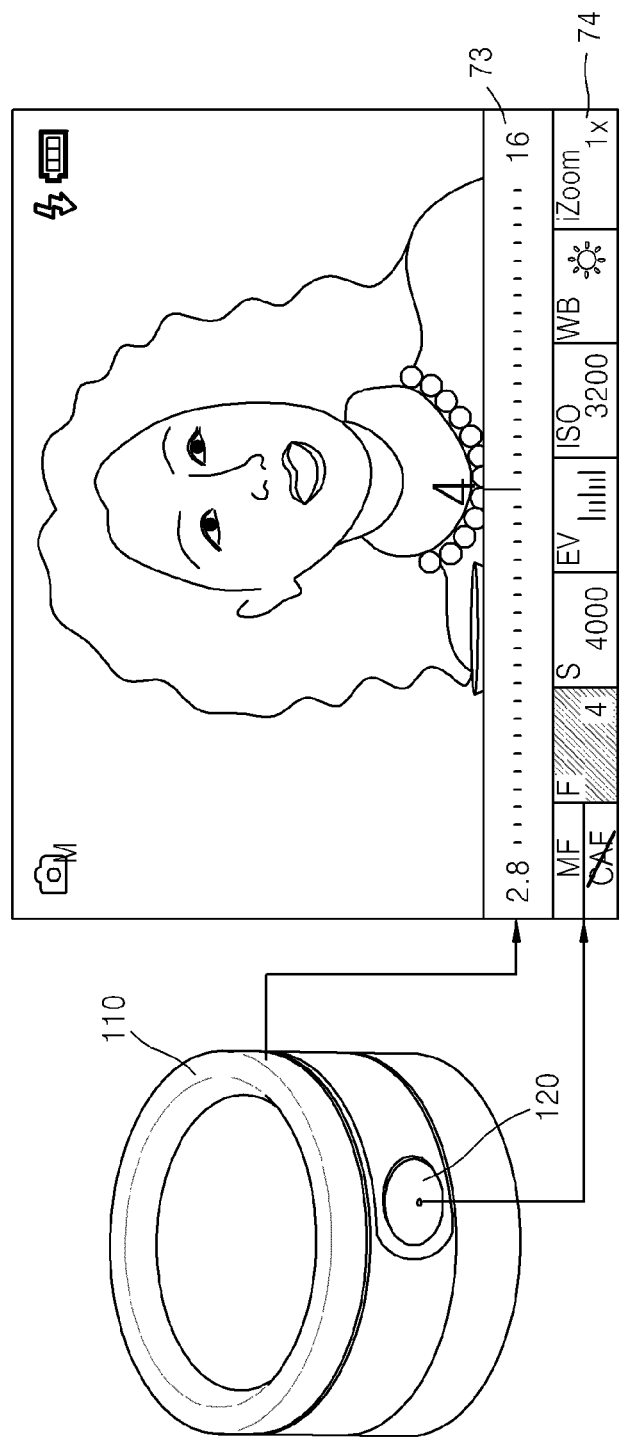
FIG. 11 is a diagram of an embodiment of the i-Function menu in which a selection bar and an adjustment bar are disposed to respectively correspond to positions of a selection button and an adjustment ring, according to an embodiment.
Figure 12:
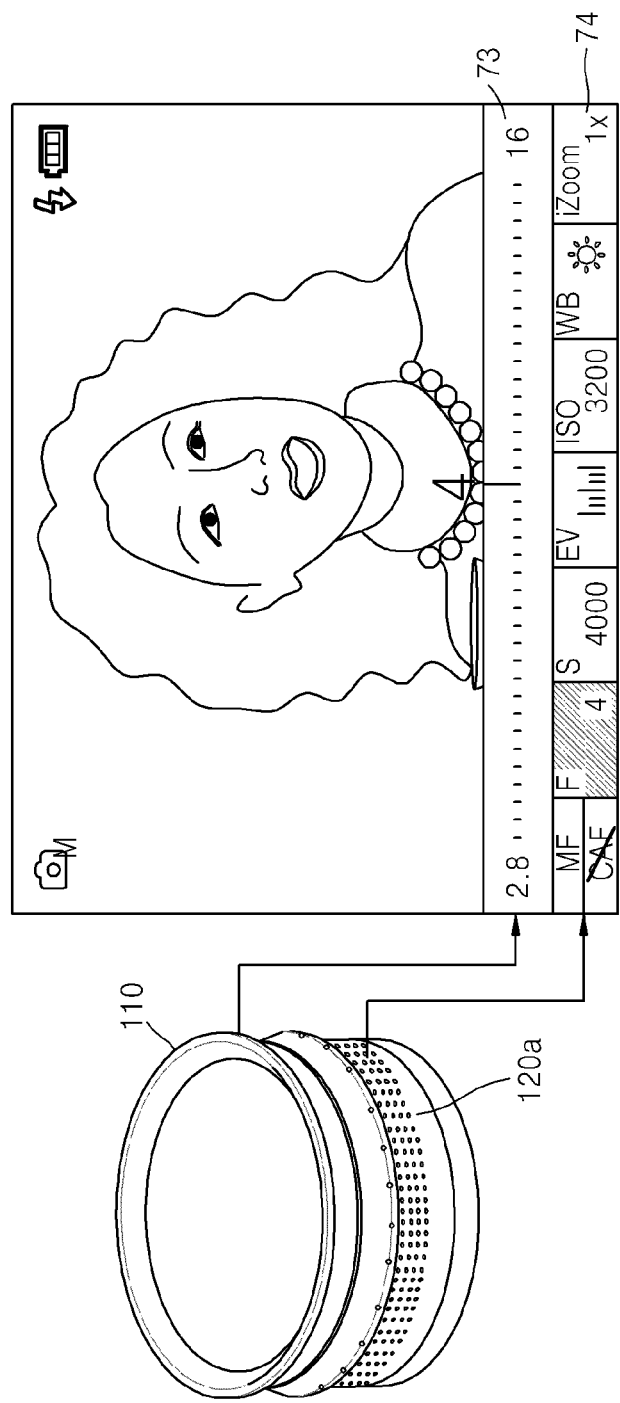
FIG. 12 is a diagram of an embodiment of the i-Function menu in which the selection bar and the adjustment bar are disposed to respectively correspond to positions of a selection ring and an adjustment ring, according to an embodiment.

FIGS. 11 and 12 illustrate embodiments of the i-Function menu in which the selection bar 74 or 84 and the adjustment bar 73 or 83 are disposed on the display screen 70 or 80 at positions corresponding to positions of the selection unit and then adjustment ring. Referring to FIGS. 11 and 12, the selection bar 74 or 84 and the adjustment bar 73 or 83 are disposed on the display screen 70 or 80 at positions corresponding to positions of the selection unit 120 and the adjustment ring 110.

That is, if the selection unit 110 is disposed behind the adjustment unit 120 with respect to the body 10a, the selection bar 74 may be disposed under the adjustment bar 73 on the display screen. In another embodiment, if the selection unit 110 is disposed in front of the adjustment unit 120 with respect to the body 10a, the selection bar 74 may be disposed above the adjustment bar 73 on the display screen.

Thus, by matching a position relation of the PUI and a position relation of the GUI, the user can set a setting function by intuitive manipulation.

FIG. 11 shows a position relationship between the selection bar 74 and the adjustment bar 73 when the selection unit 120 is the selection button 120 and the adjustment unit 110 is the adjustment ring 110 that is a rotational ring type. When the selection button 120 is disposed behind the adjustment ring 110, the selection bar 74 is disposed behind the adjustment bar 73 on the display screen.

FIG. 12 shows a position relationship between the selection bar 74 and the adjustment bar 73 when the selection unit 120 is a selection ring 120a that is a rotational ring type and the adjustment unit 110 is the adjustment ring 110 that is a rotational ring type. When the selection ring 120a is disposed behind the adjustment ring 110, the selection bar 74 is disposed under the adjustment bar 73 on the display screen.

In FIG. 7, the i-Function menu showing the selection bar 74 and the adjustment bar 73 is disposed in a lower end portion of the display screen 70. The selection bar 74 may be displayed on the selection region 72, such that display items are disposed in a horizontal direction from left to right or from right to left according to a set order. The adjustment bar 73 may be displayed on the adjustment region 71 in parallel with the selection bar 74. In this case, the selection bar 74 and the adjustment bar 73 may be displayed in an upper end portion or a lower end portion of the display screen 70.

Figure 13:
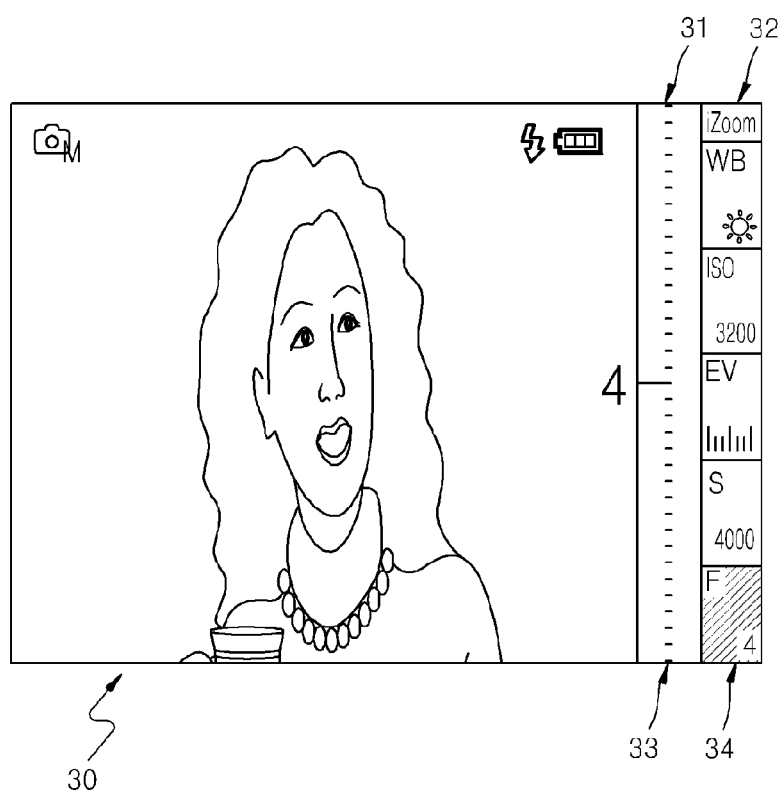
FIG. 13 is a diagram of an embodiment of the i-Function menu disposed on the right side of a display screen, according to an embodiment.

In FIG. 13, an i-Function menu showing the adjustment bar 33 and the selection bar 34 is disposed on the right side of a display screen 30.

The selection bar 34 may be disposed on a selection region 32 such that display items are disposed in a vertical direction from top to bottom or from bottom to top according to a set order. The adjustment bar 33 may be displayed on an adjustment region 31 in parallel with the selection bar 34. In this case, the selection bar 34 and the adjustment bar 33 may be displayed in a left end portion or a right end portion of the display screen 30.

When the i-Function menu is disposed in a vertical direction, the adjustment unit 110 may be the adjustment ring 110a which is slid in the longitudinal direction of the lens barrel 100a. In this case, the adjustment ring 110a moving forward or backward and the adjustment bar 33 adjusted in the vertical direction are disposed in the same direction, such that the user can intuitively connect the PUI and the GUI.

A control method for an apparatus for processing a digital image according to another embodiment is a control method for the digital image processing apparatus 10 described with reference to FIGS. 1 through 13. Thus, the description referring to FIGS. 1 through 13 can also be applied to the control method in the same manner.

The control method may include an image input operation, an image display operation, a selection region display operation, and an adjustment region display operation.

In the image input operation, an input image is inputted. In the image display operation, the input image is displayed on the display screen 70 or 80. In the selection region display operation, at least one setting item is displayed on the selection region 72 or 82 which is disposed in at least a region of the display screen 70 or 80. In the adjustment region display operation, a current setting value which is currently set for at least one of the setting items and candidate setting values that can be set for the setting item are displayed on the adjustment region 71 or 81 which is disposed in at least a region of the display screen 70 or 80.

The selection bar 74 or 84, where designated setting items are disposed in sequence according to a set display order, may be displayed on the selection region 72 or 82. Setting items and current setting values for the respective setting items may be displayed together on the selection bar 74 or 84.

The adjustment bar 73 or 83, where for a selection item designated by default or selected from among the display items, a currently set setting value and candidate setting values that can be set are disposed together in sequence, may be displayed on the adjustment region 71 or 81.

By selection of menu setting or a designated button, the selection bar 74 or 84 can be displayed on the selection region 72 or 82, and the adjustment bar 73 or 83 can be displayed on the adjustment region 71 or 81, thereby displaying the i-Function menu.

According to an embodiment, by displaying a setting item designated by the user and a setting status of a setting value for the setting item to the user, the user can efficiently set items necessary for a photographing operation and/or other operations.

While the present invention has been particularly shown and described with reference to exemplary embodiments thereof, it will be understood by those of ordinary skill in the art that various changes in form and details may be made therein without departing from the spirit and scope of the invention as defined by the following claims.

The apparatus described herein may include a processor, a memory for storing and executing program data, a permanent storage such as a disk drive, a communication port for communicating with an external device, and a user interface unit, such as a touch panel, a key, a button, etc. Methods implemented with a software module or algorithm may be stored as computer-readable codes or program commands, which can be executed on the processor, on a computer-readable recording medium, etc.

Examples of the computer-readable recording medium may include magnetic storage media such as read-only memory (ROM), random access memory (RAM), floppy disks, and hard disks, and optical data storage devices such as CD-ROMs and digital versatile discs (DVD). The computer-readable recording medium can also be distributed over a network of coupled computer systems so that the computer-readable code is stored and executed in a decentralized fashion. The code can be read by the computer, stored in the memory, and executed on the processor.

All documents cited herein, including published documents, patent applications, and patents, may be incorporated herein by reference to the same extent as if each cited document were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The present invention may be described in terms of functional block components and various processing steps. Such functional blocks may be realized by any number of hardware and/or software components configured to perform the specified functions.

For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented with an algorithm executed in one or more processors. Furthermore, the invention could employ conventional techniques for electronics configuration, signal processing and/or control, data processing, and the like. Terms such as "mechanism", "element", "means", and "structure" can be used in a broad sense and are not limited to mechanical and physical structures, but may include software routines in connection with processors, etc. The terms may include a meaning of a series of routines of software in association with a processor.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections, or logical connections may be present in a practical device. Moreover, no item or component is essential to the practice of the invention unless the element is specifically described as "essential" or "critical".

In the specification (particularly in the claims) of the invention, the use of the term "a," "an," "the," and its similar indicative terms in the context of describing the invention (especially in the context of the following claims) are to be construed to cover both singular and plural, unless the context clearly indicates otherwise. It will also be recognized that the terms "comprises," "comprising," "includes," "including," "has," and "having," as used herein, are specifically intended to be read as open-ended terms of art. In addition, it should be understood that although the terms "first," "second," etc. may be used to herein to describe various elements, these elements should not be limited by these terms, which are only used to distinguish one element from another. Furthermore, recitation of ranges of value herein are merely intended to serve as a shorthand method of referring individually to each separate value included in that range is applied (unless otherwise indicated herein), and such statement is equivalent to an incorporation of each individual value forming the range into the specification as if each value were individually recited herein. Unless the order of steps forming the method according to the present invention are explicitly stated or stated otherwise, those steps may be performed in any appropriate order. The stated order of the steps does not necessarily limit the invention.

The use of any and all examples or exemplary language (e.g. "such as," "for example," and "so forth") provided herein, is merely intended to describe the invention in detail, and thus unless defined by the claims, the scope of the invention is not limited by the example or exemplary term. In addition, it can be understood by those of ordinary skill in the art that various modifications, combinations, and changes can be made according to design conditions and factors within the scope of the claims and equivalents thereof. Therefore, the scope of the invention is defined not by the detailed description of the invention but by the following claims, and all differences within the scope will be construed as being included in the invention.

What is claimed is:

1. A digital image processing apparatus, the apparatus comprising:
 a body;
 an image input unit;
 a display unit disposed on the body with a display screen for simultaneously displaying an input image, current setting values for the displayed input image, and setting information comprising a plurality of user-selectable setting items,
 wherein the display screen includes:

a selection region where the plurality of setting items are displayed along with the input image setting values for those setting items; and an adjustment region where a current setting value is displayed together with a range of candidate setting values that can be set for a selected setting item, wherein when a setting value for at least one setting item comprising aperture, shutter speed, and exposure is changed, a setting value for another setting item is also changed in association with the changed setting value, wherein a selection bar is displayed on the selection region and the selection bar includes at least two setting items disposed along the selection bar in a sequence according to a set display order between a first edge of the display unit and a second edge opposite the first edge of the display unit, wherein an adjustment bar is displayed on the adjustment region in parallel with the selection bar and the adjustment bar includes the currently set current setting value and the candidate setting values for a selection item designated by default.

2. The apparatus of claim 1, wherein candidate items that are displayed along the selection bar are designated, and a predetermined number of display items from among the candidate items are displayed on the selection bar.

3. The apparatus of claim 2, wherein when a number of display items is less than a number of the candidate items, and the configuration of the display items changes with a change in the selection item.

4. The apparatus of claim 1, wherein the selection item is displayed differently from other display items.

5. The apparatus of claim 1, wherein at least one setting item and a current setting value for the at least one setting item are displayed together on the selection bar.

6. The apparatus of claim 1, wherein a setting range of candidate setting values that can be set for the selection item is displayed according to a set order and the current setting value is also displayed together with the setting range on the adjustment bar.

7. The apparatus of claim 6, wherein the setting range is displayed as at least one of an image and a character on the adjustment bar; and a lower limit, an upper limit, and a current setting value of the setting range are displayed as characters.

8. The apparatus of claim 6, wherein the setting range is displayed in the shape of at least one of a graduated ruler and a bar graph on the adjustment bar.

9. The apparatus of claim 6, wherein the setting range of candidate setting values that can be set for the selection item is displayed on the adjustment bar, such that the candidate setting values are consecutively displayed according to a magnitude thereof.

10. The apparatus of claim 1, further comprising a lens module mounted on the body, wherein a selection unit for selecting a selection item to be set from among a plurality of setting items is disposed in the body, and an adjustment unit for adjusting a setting value for the selection item by manipulation of the adjustment unit is disposed in the lens module.

11. The apparatus of claim 10, wherein the selection unit is at least one of a button, a sliding switch, and a rotation selector switch.

12. The apparatus of claim 10, wherein the selection unit is a selection ring installed in a lens barrel, and the selection ring is adapted to be at least one of rotated with respect to the lens barrel and slid in a longitudinal direction of the lens barrel.

13. The apparatus of claim 10, wherein the adjustment unit is an adjustment ring installed in a lens barrel.

14. The apparatus of claim 13, wherein the adjustment ring is at least one of a focus adjust ring for adjusting focus by manipulation thereof, a zoom adjust ring for adjusting zoom by manipulation thereof, and an aperture adjust ring for adjusting an aperture by manipulation thereof.

15. The apparatus of claim 10, wherein the lens module is detachable from the body.

16. The apparatus of claim 10, wherein when the selection unit operates, a selection bar is displayed on the selection region and an adjustment bar is displayed on the adjustment region.

17. The apparatus of claim 10, wherein when the adjustment unit operates during an on-state of a set function, a selection bar is displayed on the selection region and an adjustment bar is displayed on the adjustment region.

18. The apparatus of claim 10, wherein the selection unit is disposed behind the adjustment unit with respect to the body, and the selection region is disposed below the adjustment region on the display unit.

19. The apparatus of claim 10, wherein the selection unit is disposed in front of the adjustment unit with respect to the body, and the selection region is disposed above the adjustment region on the display unit.

20. The apparatus of claim 1, wherein by at least one of a selection of a menu setting and a designated button, the selection bar is displayed on the selection region and the adjustment bar is displayed on the adjustment region.

21. The apparatus of claim 1, wherein the selection bar and the adjustment bar are displayed in at least one end portion of the display unit.

22. The apparatus of claim 1, wherein the adjustment unit is an adjustment ring installed in the lens barrel, and the adjustment ring is slid in a longitudinal direction of a lens barrel.

23. The apparatus of claim 1, wherein a setting value set by at least one of the setting items having a discontinuous setting value is changed by a manipulation unit that is at least one of a button, a sliding switch, and a rotation selector switch.

24. The apparatus of claim 1, wherein a setting value set by at least one of the setting items having a continuous setting value is changed by a ring-type manipulation unit.

25. The apparatus of claim 1, wherein at least one of the selection region and the adjustment region is disposed in a blank region generated due to a difference in an aspect ratio between the display unit and an image sensor of the display unit.

26. The apparatus of claim 25, wherein when a live view image is displayed on the display unit, currently set setting information is displayed on the blank region.

27. The apparatus of claim 26, wherein when a preset setting function is called, at least one of the selection region and the adjustment region is displayed on the blank region.

28. The apparatus of claim 1, wherein when a setting value for a setting item is changed, the changed setting value is reflected in real time on the adjustment bar during an operation.

29. The apparatus of claim 1, further comprising an image input unit through which an input image is inputted, wherein if a setting value for at least one setting item is changed, the input image is inputted based on the changed setting value, and the input image based on the changed setting value is displayed as a live view on the display unit.

30. A method of controlling a digital image processing apparatus, the method comprising:

receiving an input image;
displaying the input image on a display unit;
displaying a plurality of setting items on a selection region of the display unit along with the input image and current setting values for the plurality of setting items;
displaying a current setting value and a range of candidate setting values for a selected setting item together on an adjustment region of the display unit,
wherein when a setting value for at least one setting item comprising aperture, shutter speed, and exposure is changed, a setting value for another setting item is also changed in association with the changed setting value,
wherein a selection bar, where display items are disposed in a sequence according to a set display order along the selection bar between a first edge of the display unit and a second edge opposite the first edge of the display unit, is displayed on the selection region, and an adjustment bar, where for a selection item designated by default or selected from among the display items, a currently set current setting value and candidate setting values that can be set are disposed in a sequence, is displayed along the adjustment bar in the adjustment region.

31. The method of claim 30, wherein the setting items and current setting values for the respective setting items are displayed together on the selection bar.

32. The method of claim 30, wherein a setting range of the candidate setting values that can be set for the selection item is displayed along the adjustment bar, such that the candidate setting values are consecutively displayed according to a magnitude thereof.

33. The method of claim 30, wherein by at least one of a selection of a menu setting and a designated button, the selection bar is displayed on the selection region and the adjustment bar is displayed on the adjustment region.

* * * * *